United States Patent
Balachandran et al.

(10) Patent No.: US 7,116,982 B2
(45) Date of Patent: Oct. 3, 2006

(54) METHODS AND SYSTEMS FOR ASSIGNING CHANNELS IN A POWER CONTROLLED TIME SLOTTED WIRELESS COMMUNICATIONS SYSTEM

(75) Inventors: Krishna Balachandran, Morganville, NJ (US); Joseph H. Kang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 567 days.

(21) Appl. No.: 10/375,122

(22) Filed: Feb. 28, 2003

(65) Prior Publication Data

US 2004/0171401 A1 Sep. 2, 2004

(51) Int. Cl.
*H04Q 7/20* (2006.01)
(52) U.S. Cl. .................. 455/452.2; 455/69; 455/67.11; 455/451; 455/452.1
(58) Field of Classification Search ................ 455/450, 455/451, 452.1, 422, 69, 453, 67.11, 67.13, 455/464, 13.4, 509, 513, 515, 63.1, 70, 103, 455/151.1, 154.1, 166.2, 179.1; 370/302, 370/329, 341, 343, 431, 437, 462, 464
See application file for complete search history.

(56) References Cited

U.S. PATENT DOCUMENTS

| 5,280,288 | A | * | 1/1994 | Sherry et al. | .................. 342/83 |
| 5,483,666 | A | * | 1/1996 | Yamada et al. | .............. 455/454 |
| 6,104,930 | A | * | 8/2000 | Ward et al. | .................. 455/450 |
| 2003/0123425 | A1 | * | 7/2003 | Walton et al. | .............. 370/341 |
| 2004/0053587 | A1 | * | 3/2004 | Nagai et al. | ................. 455/132 |
| 2005/0037766 | A1 | * | 2/2005 | Hans et al. | .................. 455/450 |

* cited by examiner

*Primary Examiner*—Nay Maung
*Assistant Examiner*—Dominic E. Rego

(57) ABSTRACT

Systems and methods for intelligently assigning a channel to a device being used by a mobile user in a power controlled, wireless communications system by minimizing the difference between a mobile user's received signal power and the minimum received signal power of a current user on a candidate carrier frequency. Each carrier frequency within a cell is examined to determine whether it has at least one current user assigned to a channel and also has at least one unoccupied channel. For each carrier frequency that meets both of these requirements, a channel quality metric is obtained for each occupied channel. The carrier frequencies are pruned down to a subset of candidate carrier frequencies using the channel quality metrics. Finally, a channel within the set of candidate carrier frequencies is selected by computing a cost function based on the received signal power of the mobile user and the received signal power of each occupied channel.

35 Claims, 7 Drawing Sheets

METHODS AND SYSTEMS FOR ASSIGNING CHANNELS IN A POWER CONTROLLED TIME SLOTTED WIRELESS COMMUNICATIONS SYSTEM

TECHNICAL FIELD

This invention relates to communications systems and, more particularly, to methods and systems for assigning channels assignment in a wireless communications system.

BACKGROUND OF THE INVENTION

Advances in wireless technologies have allowed network operators to improve the features and services that can be provided to end users. New techniques, such as power control and link quality based physical channel-assignment, enable tighter frequency reuse and improve spectral efficiency. As a result, these features strongly influence a network operator's ability to provide adequate quality of service to a large number of users. In sparse reuse deployments that are limited by the number of channels rather than interference levels, channels may be assigned randomly to end users. However, channel assignment techniques that rely on interference measurements have recently been employed to achieve better spectral efficiency through tighter reuse. The benefit of interference-based channel assignment, e.g., assignment to the lowest interference channel, is that users are more likely to encounter good quality on this channel and as a result are more likely to maintain sufficient quality with reduced transmit powers. Such power control allows the interference in the network to be reduced and therefore, allows higher system capacity to be achieved.

When power control techniques are employed, minimum interference based channel assignment may not maximize power control gains. For instance, in IS-136 networks where discontinuous transmission is unavailable on the downlinks, performance may be improved by packing users onto idle slots of active carrier frequencies to minimize the amount of network-wide interference. In addition, practical systems typically have limited dynamic range that can impact channel assignment decisions. Finally, there may be transmit power variation constraints between time slots on a carrier frequency. In order to guarantee sufficient quality to end users, the carrier's transmit power may be dictated by the worst quality user, thereby limiting power control gains. In such cases, good users on a carrier may experience much higher quality than necessary since there are users with worse quality on the carrier who require higher transmit powers.

SUMMARY OF THE INVENTION

It is recognized that there is a continuing need for techniques that efficiently provide channel assignments in wireless communications systems that employ power controlled channels. In particular, there is a need for efficiently assigning channels to mobile users based on minimizing the difference between the received signal power from the mobile user and the received signal power from current users operating within the communications system.

The present invention meets the needs described above through techniques which intelligently assign channels to achieve better performance (higher system capacity and/or spectral efficiency) under the power control constraints discussed above. In particular, if users with similar received signal strengths are assigned to the same carrier, then power control performance can be significantly improved resulting in higher spectral efficiency. Generally described, the invention includes an intelligent method of assigning a channel to a mobile user in a wireless communications system employing power controlled channels by minimizing the difference between the mobile user's received signal power and the worst received signal power of a current user on a candidate carrier frequency. The method begins by obtaining a received signal power for a mobile user requesting a channel assignment. Each channel on each carrier frequency is examined to determine which carrier frequencies have at least one current user assigned to a channel and also have at least one unoccupied channel. For each carrier frequency that meets both requirements, both a channel quality metric, such as the bit error rate (BER), and received signal strength are estimated for each channel occupied by a current user. The carrier frequencies are then pruned down to a subset of candidate carrier frequencies using the channel quality metrics. Finally, a channel on one of the candidate carrier frequencies may be selected by computing a cost function based on the received signal power of the mobile user, the received signal power of the current users, and/or the interference measurement of all candidate carrier frequencies.

DETAILED DESCRIPTION OF THE INVENTION

Figure 1:
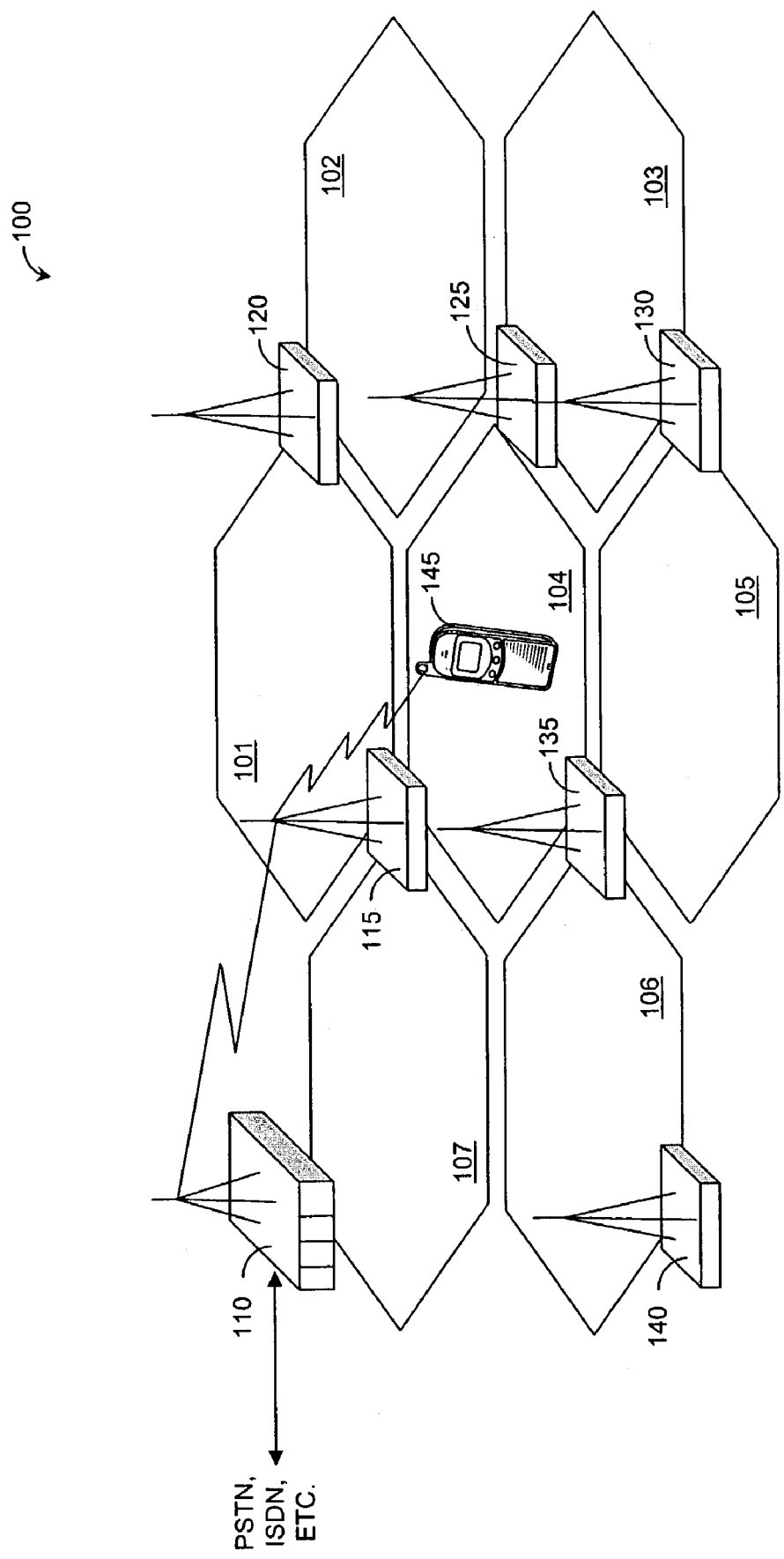
FIG. 1 is a block diagram illustrating a wireless communications network used in accordance with one embodiment of the present invention.

The present invention is embodied in techniques used within a wireless communications network to maximize power control gains. Typically, these techniques are embodied in a base station (BS) of a power-controlled wireless communications network. The techniques can also be embodied either in part or in their entirety in a unit that maintains communications with multiple base stations, such as the Mobile Switching Center (MSC). Without loss of generality, consider a power-controlled wireless network that cannot vary the transmit power on a carrier by more than x decibels from slot to slot. In addition, assume that power control techniques are designed to satisfy the quality of service requirements for all users on a carrier, including the worst user. By assigning a mobile user to a channel that minimizes the difference between the user's received signal power and the received signal power corresponding to the worst user on a candidate frequency, power control gains can be maximized. For purposes of this application, the term "mobile user" is used to indicate a mobile device used by a user.

One drawback of channel assignment based on received signal strength alone is that individual user quality may not be satisfied. For example, consider a mobile user, i.e., someone using a mobile device, with low signal power. Matching the mobile user requesting an assignment to a carrier with similar low signal power users may lead to poor quality since the assignment is done without considering interference. Since users typically report channel quality metrics, such as bit error rate (BER), frame error rate (FER), interference, and the like to the BS (or MSC), this problem is addressed by using these channel quality metrics to eliminate frequencies with excessive interference. These typically correspond to carrier frequencies on which current users experience poor call quality, e.g., high BER, FER, etc. If such an assignment had been allowed, it is likely that the assigned mobile user would also experience insufficient call quality.

An exemplary embodiment of the present invention is embodied in a technique, e.g., a computer program or algorithm that minimizes the difference in received signal powers between a mobile user requesting assignment and a current user on a candidate carrier frequency. The technique is initiated by receiving a request for a channel assignment from a mobile user. The request may be generated whenever one or more of the following events occur: the mobile user initiates a new call; the mobile user experiences unacceptable call quality and hands off to another channel within the sector or to another base station; the mobile user detects sufficient changes in received signal strengths or interference levels; or any other event that causes the base station to assign a new channel to the mobile user.

Once a request for channel assignment is received, the carrier frequencies of the cell handling the mobile user are examined to determine which of them have at least one current user and at least one unoccupied channel. After the request is received, the carrier frequencies serving the cell or group of cells are examined and any carrier frequency that does not have at least one current occupied channel and at least one unoccupied channel is eliminated from consideration. It is important to give preference to carrier frequencies that have at least one current user to ensure efficient packing of the carrier frequency and to reduce system interference.

Next, the set of carrier frequencies with idle (or unassigned) channels and at least one currently assigned user is pruned to a size N such that none of the current users assigned to the N candidate carrier frequencies are experiencing "poor" radio link quality. For example, let the mobile user requiring channel assignment have a received signal power denoted by C. Furthermore, let the received signal power for a current user on the $j^{th}$ assigned time slot of the $k^{th}$ candidate carrier frequency be represented as $C_{k,j}$. In general, assignment is made to the carrier frequency determined by a cost function denoted by $f(C, \{C_{k,j}\})$ where $k=1, 2, \ldots, N$, and for each value of k, the index $j=1, 2, \ldots, n_k$ where $n_k$ is number of channels with active users in the $k^{th}$ carrier frequency and can take values from 1 up to M, where M is the number of channels. Typically for ANSI-136 based TDMA systems M is set to three. In an exemplary embodiment of the invention, the cost function $f(x)$ is given by the equation:

$$f(x) = \min_k |C - \min_{j=1}^{n_k} C_{k,j}|. \qquad (1)$$

Consider an example where channel assignment is determined for a mobile user with signal power, C=−75 dBm entering a cell of a wireless communications system that has six carrier frequencies denoted by the carrier frequency indices 0, 1, 2, 3, 4, and 5. In Table 1, signal powers and channel quality reports for candidate channels are displayed for active users, if applicable. Empty entries in the table indicate unassigned time slots. In this example, channel quality is derived from channel quality reports, but could be inferred or estimated instead. For simplicity, channel quality reports described in the table are classified as either "good" or "poor." The channel quality report is based on a channel quality metric, such as the bit error rate (BER), frame error rate (FER), interference, or the like. A channel is considered "good" if the channel quality metric indicates better quality than a predetermined threshold value. Conversely, a channel is considered "poor" if the channel quality metric indicates worse quality than a predetermined threshold value. Table 1 depicts an exemplary configuration at the time of a channel assignment.

TABLE 1

Example configuration at the time of channel assignment.

| Carrier Frequency Index | Channel 0 | | Channel 1 | | Channel 2 | |
|---|---|---|---|---|---|---|
| | Signal Power | Quality Report | Signal Power | Quality Report | Signal Power | Quality Report |
| 0 | −80 dBm | Good | −70 dBm | Good | — | — |
| 1 | −64 dBm | Good | — | — | −69 dBm | Good |
| 2 | — | — | −67 dBm | Good | −73 dBm | Good |
| 3 | −71 dBm | Good | | | | |
| 4 | — | — | −75 dBm | Good | −81 dBm | Poor |
| 5 | −75 dBm | Good | −67 dBm | Good | −73 dBm | Poor |

To calculate a cost function of equation (1), carrier frequency indices are first examined to determine if there is at least one current user and one available channel. Carrier frequency indices that do not have at least one occupied channel and at least one current user are excluded from consideration. Thus, in Table 1, the carrier frequency index 5 has no available channels and therefore, is eliminated from consideration as a candidate carrier frequency for channel assignment.

Next, the remaining carrier frequency indices are examined to determine whether any channel has a "poor" quality report. If any of the channels in a carrier frequency index have a "poor" quality report, that carrier frequency index is eliminated from consideration. Returning to Table 1, carrier frequency indices 4 and 5 have at least one "poor" quality report and therefore, are eliminated from consideration. As a result, there are four (N=4) candidate carrier frequencies remaining for assignment to a mobile user.

Alternatively, instead of eliminating carrier frequencies based on the comparison of a channel quality metric to a predefined value, a more robust method of channel candidate elimination may be used. Channel candidate elimination is essential to provide sufficient call quality, but aggressive elimination techniques can make the candidate list small and reduce the probability that a good match in signal power will occur. Ideally, the channel quality reports would provide channel information only. Unfortunately, channel quality reports in networks today, e.g. BER or FER, are often a function of received signal power as well. Although equation (1) attempts to minimize the difference in signal power, the difference is typically non-zero. As a result, one method of eliminating candidate carrier frequencies might attempt to compensate for differences in signal power. Consider the following example where $\Delta C$ denotes the difference between the received power of a mobile user and the received power of a current user, i.e., current user's mobile device, assigned to the channel. Assume that a carrier frequency requires a received signal power-to-interference (C/I) ratio of 25 dB to provide sufficient call quality, but a current user on a candidate carrier has a channel quality corresponding to a C/I of 16 dB. $\Delta C$ is added to the channel quality metric, i.e., BER, and compared to a predetermined C/I threshold value for the channel. For example, a carrier frequency may require a C/I ratio of 25 dB to operate efficiently and a current user may report a BER that corresponds to 16 dB. If $\Delta C$ of the channel carrier is 5 dB, then $\Delta C+16=21$ dB, which is below the threshold C/I ratio of 25 dB to operate properly. Therefore, the corresponding carrier frequency would be discarded from consideration for assignment to the mobile user. However, if $\Delta C$ of the channel were 10 dB, then $\Delta C+16=26$ dB, which exceeds the threshold value of 25 dB. Thus, in this instance, the corresponding carrier frequency would remain a candidate for channel assignment.

The remaining subset of candidate carrier frequencies is used to calculate the value of the cost function and to determine the optimal carrier frequency and channel for the user. For each carrier frequency index, the channel with the "worst" received signal power (minimum received signal power) is determined. Next, the absolute difference between the received signal power from the mobile user and the "worst" received signal power is calculated. Table 2 summarizes the calculations for each remaining candidate carrier frequency index shown in Table 1.

TABLE 2

Summary of cost function computations for candidate carrier frequencies for proposed channel.

| Candidate Carrier Frequency Index k | C (dBm) | $n_k$ | $C_{k,1}$ (dBm) | $C_{k,2}$ (dBm) | $\min_{j=1}^{n_k} C_{k,j}$ (dBm) | $\|C - \min_{j=1}^{n_k} C_{k,j}\|$ (dBm) |
|---|---|---|---|---|---|---|
| 0 | −75 | 2 | −80 | −70 | −80 | 5 |
| 1 | −75 | 2 | −64 | −69 | −69 | 6 |
| 2 | −75 | 2 | −67 | −73 | −73 | 2 |
| 3 | −75 | 1 | −71 | — | −71 | 4 |

Next, the carrier frequency index that has the minimum computed value is selected as the most efficient carrier frequency to assign to the mobile user. As illustrated in Table 2, the carrier frequency index number 2 has the smallest value and therefore is selected by the cost function as the most efficient carrier. The user is then assigned to one of the unoccupied channels associated with carrier frequency index number 2. Although the cost function described above tries to assign mobile users with similar transmit power requirements to the same carrier frequency, it does not attempt to differentiate between carrier frequencies on the basis of interference. For instance, some base stations lack the ability to track carrier frequency interference. In addition, some base stations may be able to monitor interference levels over carrier frequencies, but it may be impractical to incorporate these levels into channel assignment computations due to hardware constraints. Because transmit power requirements depend on each user's received signal strength and the average interference level on the carrier, it may be possible to achieve greater power reductions by considering the following cost function that accounts for both factors. Thus, a modified version of equation (1) that accounts for interference measurements may be represented as:

$$f(x) = \min_k \left[ \left| C - (\min_{j=1}^{n_k} C_{k,j}) \right| + I_k \right]_k, \qquad (2)$$

where $I_k$ is the average interference of the $k^{th}$ carrier frequency. Returning to the example above, if the average interference value for the 0, 1, 2, and 3 carrier frequency indexes are −96 dBm, −100 dBm, −94, dBm, and −102 dBm, respectively, the value of the cost function for each frequency would be −91, −94, −92, −98, respectively. A summary of the calculations, including the average interference values, for the carrier frequencies is provided in Table 3.

TABLE 3

Summary of computed values for candidate carrier frequencies for proposed channel assignment using average channel interference.

| Candidate Carrier Frequency Index k | C (dBm) | $I_k$ (dBm) | $n_k$ | $C_{k,1}$ (dBm) | $C_{k,2}$ (dBm) | $\min_{j=1}^{n_k} C_{k,j}$ (dBm) | $\|C - \min_{j=1}^{n_k} C_{k,j}\| + I_k$ (dBm) |
|---|---|---|---|---|---|---|---|
| 0 | −75 | −96 | 2 | −80 | −70 | −80 | −91 |
| 1 | −75 | −100 | 2 | −64 | −69 | −69 | −94 |

TABLE 3-continued

Summary of computed values for candidate carrier
frequencies for proposed channel assignment
using average channel interference.

| Candidate Carrier Frequency Index k | C (dBm) | $I_k$ (dBm) | $n_k$ | $C_{k,1}$ (dBm) | $C_{k,2}$ (dBm) | $\min_{j=1}^{n_k} C_{k,j}$ (dBm) | $\lvert C - \min_{j=1}^{n_k} C_{k,j} \rvert + I_k$ (dBm) |
|---|---|---|---|---|---|---|---|
| 2 | −75 | −94 | 2 | −67 | −73 | −73 | −92 |
| 3 | −75 | −102 | 1 | −71 | — | −71 | −98 |

As seen from Table 3, the carrier frequency with index 3 yields the minimum computed value. Therefore, an unoccupied channel from carrier frequency index 3 would be assigned to a mobile user. The method described above is applicable to the case where transmit power variation constraints from slot to slot within a carrier frequency are allowed. The use of an exemplary channel assignment technique envisioned by the present invention to select the most efficient channel allows users with similar transmit power needs to be assigned to the same carrier frequency, thereby maximizing power control gains under transmit power variation constraints.

In an alternative embodiment of the present invention, the selection of candidate carrier frequencies comprises identifying carrier frequencies that have sufficient channel quality and have at least one occupied and one unoccupied channel. For each identified carrier frequency, the minimum received signal power among current users is determined. If the minimum received signal power on at least one identified carrier frequency is less than the received signal power of the user, then all carrier frequencies whose minimum received signal power is less than the received signal power of the user will be deemed candidates for channel selection. For example in Table 3, only the candidate carrier frequency with index 0 satisfies the requirements. If there are more than one remaining candidate carrier frequency, the cost function then determines which of the three candidate frequencies to select. The same cost functions described above may be employed to determine the channel that is assigned to the user. In this way, newly assigned users are unlikely to force the carrier to transmit at higher power.

In an alternative embodiment of the present invention, the absolute difference between the received signal power of the mobile user and the minimum received signal power of a candidate carrier frequency is compared to a predetermined power threshold value, denoted by $C_{th}$. If the absolute difference for a particular candidate carrier frequency is greater than the predetermined threshold value $C_{th}$, the carrier frequency is discarded from consideration as a candidate for assignment to the mobile user. If all of the carrier frequencies are similarly discarded, a mobile user is assigned to the candidate carrier frequency that has the lowest average interference level. There may be some instances where it may not be possible to determine the average interference level of the carrier frequency. In these instances, a mobile user may be assigned to an unoccupied channel on any of the candidate carrier frequencies.

In yet another alternative embodiment, the cost function may be computed by determining the sum of the difference between the received signal power of a mobile user and the received signal power for a current user in each occupied channel for each carrier frequency raised to a power p. The carrier frequency that achieves the smallest value is selected as the most efficient carrier frequency for assignment to a mobile user. The cost function for the alternative embodiment may be given by the equation:

$$f(x) = \min_k \frac{1}{n_k} \sum_{j=1}^{n_k} \lvert C - C_{k,j} \rvert^p, \qquad (3)$$

where all terms have been previously defined. Returning to the example, the computations of the sum of the squares (p=2) of the difference of the received power of the mobile user and the received power from the current users for each occupied channel and for each carrier frequency are summarized in Table 4.

TABLE 4

Summary of computations given by equation (3)
computed for proposed channel
assignment of Table 1.

| Candidate Carrier Frequency Index k | C (dBm) | $n_k$ | $C_{K,1}$ (dBm) | $C_{K,2}$ (dBm) | $\frac{1}{n_k}\sum_{j=1}^{n_k}\lvert C - C_{k,j}\rvert^2$ |
|---|---|---|---|---|---|
| 0 | −75 | 2 | −80 | −70 | 25 |
| 1 | −75 | 2 | −64 | −69 | 78.5 |
| 2 | −75 | 2 | −67 | −73 | 34 |
| 3 | −75 | 1 | −71 | — | 16 |

As see from Table 4, the carrier frequency index number 3 has the smallest value and therefore is selected by the cost function as the most efficient carrier. One of the unoccupied channels associated with carrier frequency index number 3 is then assigned to a mobile user.

As with the previous embodiment, it may be possible to achieve greater power reductions by considering the average interference levels for each carrier frequency. Thus, equation (3) becomes:

$$f(x) = \min_k \frac{1}{n_k} \sum_{j=1}^{n_k} \lvert C - C_{k,j} \rvert^p + I_k \qquad (4)$$

TABLE 5

Summary of cost function given by equation (4) computed for proposed channel assignment.

| Candidate Carrier Frequency Index k | C (dBm) | $I_k$ (dBm) | $n_k$ | $C_{k,1}$ (dBm) | $C_{k,2}$ (dBm) | $\frac{1}{n_k}\sum_{j=1}^{n_k}|C-C_{k,j}|^2$ | $\frac{1}{n_k}\sum_{j=1}^{n_k}|C-C_{k,j}|^2 + I_k$ |
|---|---|---|---|---|---|---|---|
| 0 | −75 | −96 | 2 | −80 | −70 | 25 | −71 |
| 1 | −75 | −100 | 2 | −64 | −69 | 78.5 | −21.5 |
| 2 | −75 | −94 | 2 | −67 | −73 | 34 | −60 |
| 3 | −75 | −102 | 1 | −71 | — | 16 | −86 |

Unfortunately, there may be instances when the mobile user cannot be efficiently assigned to a channel using the above-described techniques. For example, if all of the carrier frequencies are eliminated from consideration due to a "poor" channel report, i.e., unacceptably high BER, then the mobile user should still be assigned a frequency rather than being blocked or dropped from the network. Instead of assigning the mobile user to a channel with poor quality, an attempt will be made to open a new carrier frequency, if one is available. If a new carrier frequency is not available, then the mobile user will be assigned to an unoccupied channel on the first available carrier frequency.

Turning now to the figures, in which like numerals refer to like elements through the several figures, FIG. 1 is an illustration of a cellular network 100 used in connection with an exemplary embodiment of the invention. The cellular network 100 contains a number of cells 101, 102, 103, 104, 105, 106, and 107 distributed over a wide area. Although FIG. 1 only shows 7 cells, those skilled in the art appreciate that a cellular network can contain tens or even hundreds of cells.

Each cell (101, 102, 103, 104, 105, 106, and 107) is serviced by at least one base station (BS) 115, 120, 125, 130, 135, and 140, each of which contains a transceiver and an antenna. Each cell site has a link to a mobile switching center (MSC) 110. In an exemplary embodiment of the present invention, a channel assignment unit (CAU) 111 is adapted to carry out the channel assignment technique described above and below. The CAU 111, which may contain a receiver for receiving the received signal power from a mobile user 145 and a processor unit for determining the channel assignment. The CAU 111 may reside in either the BS 115, 120, 125, 130, 135, and 140 or an entity that communicates with multiple base stations, such as the MSC 110. In addition, the BS 115, 120, 125, 130, 135, and 140 and MSC 110 may each contain a separate processor unit. This allows the many functions of the CAU 111 may be divided and carried out by the BS 115, 120, 125, 130, 135, and 140 and MSC 110. For example, the BS 115 associated with the mobile user 145 may perform a portion of the channel assignment function while the MSC 110 remotely performs another portion of the channel assignment function.

When the mobile user 145 turns on a cellular telephone in a particular cell 104, a serving BS is selected based on signal strength and channel availability. The serving BS is the BS that will handle or "serve" the user's communication needs and is typically located near the user. After a serving BS is chosen, the CAU 111 may contain a receiver that collects the necessary information, e.g. signal strengths, channel quality reports, and interference measurements from the mobile and active users on candidate carrier frequencies, if applicable, and a processor unit for selecting a channel for assignment. Preference is given to a radio frequency with at least one idle and one active channel so that in the absence of discontinuous transmission, the number of active radio frequencies and hence, the level of system interference, is minimized. Channel assignment is based on both the received signal power of the mobile user 145 and the received signal power of all current users. The precise technique used for channel selection is described in greater detail below. In short, the technique assigns the user to a carrier frequency with users that have similar transmit power requirements, thereby maximizing power control gains under transmit power variation constraints.

Figure 2:
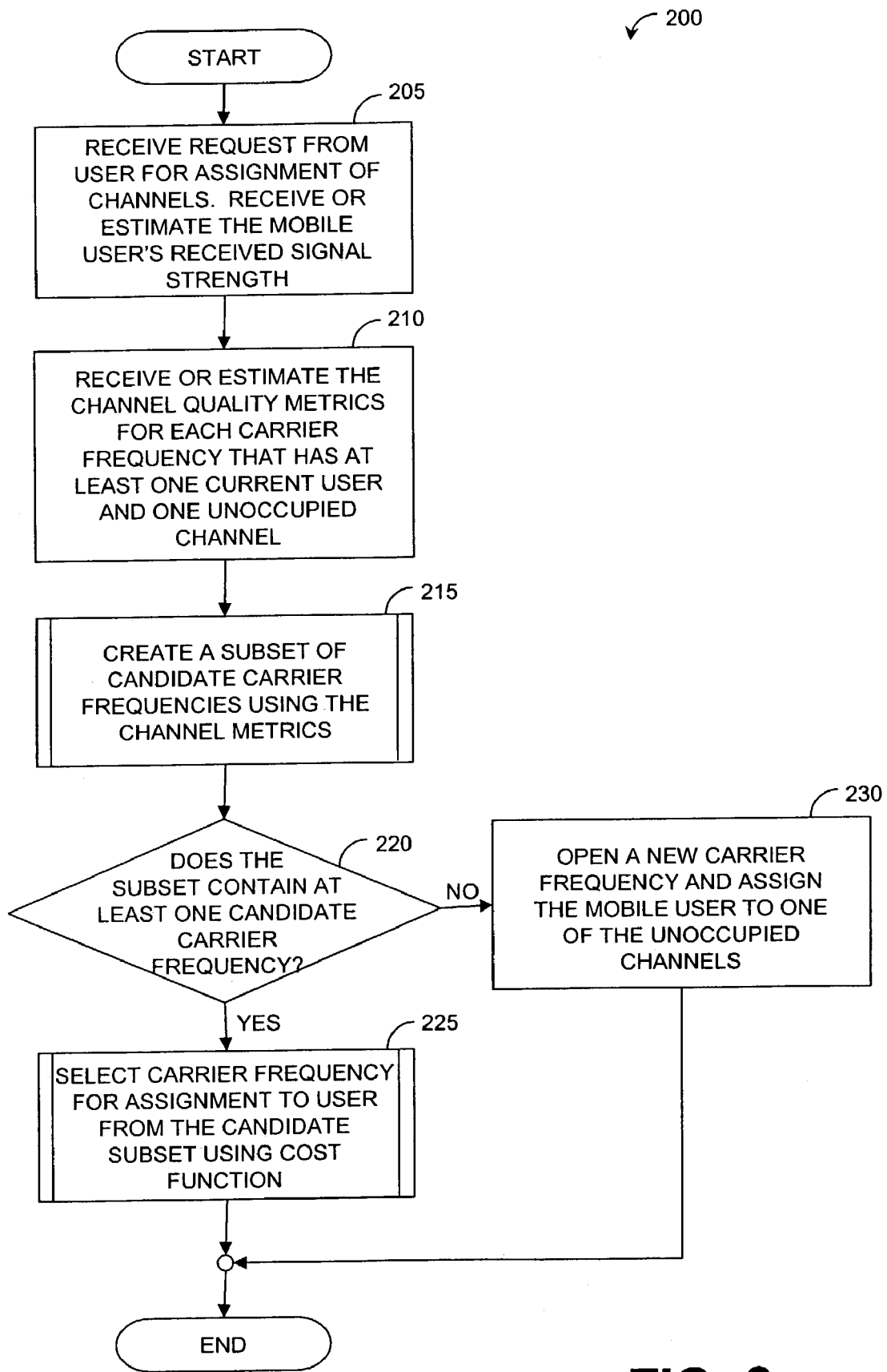
FIG. 2 is a logic flow diagram illustrating an exemplary routine for assigning channels in a power controlled, time slotted communications system.

FIG. 2 is a logic flow diagram illustrating the assignment of a channel to a user in a power controlled, time slotted communications system according to one embodiment of the present invention. Beginning at 205, a request for a channel assignment is received from a mobile user 145. The request typically occurs during an initial call setup when the mobile user 145 first enters the area covered by cell 104. However, the request may also occur when the mobile user 145 is handed off to another channel within the cell or to another cell altogether. The signal strength of the mobile device used by the mobile user is also obtained.

At 210, the carrier frequencies with at least one current user and at least one unassigned channel are identified. For these carrier frequencies, received signal strength and channel quality metrics are obtained for all active users. A channel quality metric is used to determine whether the channel quality is acceptable or not. Typically, a channel quality metric, such as BER, is compared to a predetermined threshold value. If the channel quality metric is better than the predetermined value, then the channel quality is said to be "good." If, however, the channel quality metric is worse than the predetermined threshold value, then the channel quality is determined to be "poor." For example, suppose that the channel quality metric used to determine channel quality is the BER, that the BER threshold value is set at $10^{-4}$, and that lower BER values indicate better channel quality. If the BER of the signal is greater than $10^{-4}$ then the quality of the channel is determined to be "poor," whereas if the BER of the received signal is less than $10^{-4}$, the quality of the channel is determined to be "good." Although the BER has been described as the channel quality metric used to determine the channel quality, those skilled in the art will appreciate that other channel quality metrics, such as FER, channel interference, and the like, may be used to determine the quality of channels without departing from the scope of the present invention.

At 215, a subset of candidate carrier frequencies is created using the channel quality metrics. For each carrier frequency, the channel quality metrics are examined and perhaps processed, e.g., conversion to C/I or compensation of differences in signal levels of users. If at least one channel quality metric or its processed version is worse than the predetermined threshold value, then the carrier frequency is discarded. However, if all of the channel quality metrics on the carrier frequency are better than the predetermined threshold, the carrier frequency is added to a subset of candidate carrier frequencies that may be used to assign a channel to the mobile user 145.

At 220, a determination is made as to whether the subset of candidate carrier frequencies contains at least one carrier frequency. If so, then the "YES" branch is followed to 225, in which a channel is selected to be assigned to a mobile user 145. Channel assignment is determined by calculating a cost function that is based on the received signal power of the mobile user 145 and the received signal power of the current users on each of the carrier frequencies in the candidate list. The details of calculating the cost function are described below. However, if all of the candidate carrier frequencies are discarded due to poor channel quality metrics, the "NO" branch is followed to 230 where a technique envisioned by the present invention opens a new carrier frequency and assigns the mobile user to an unoccupied channel.

Figure 3:
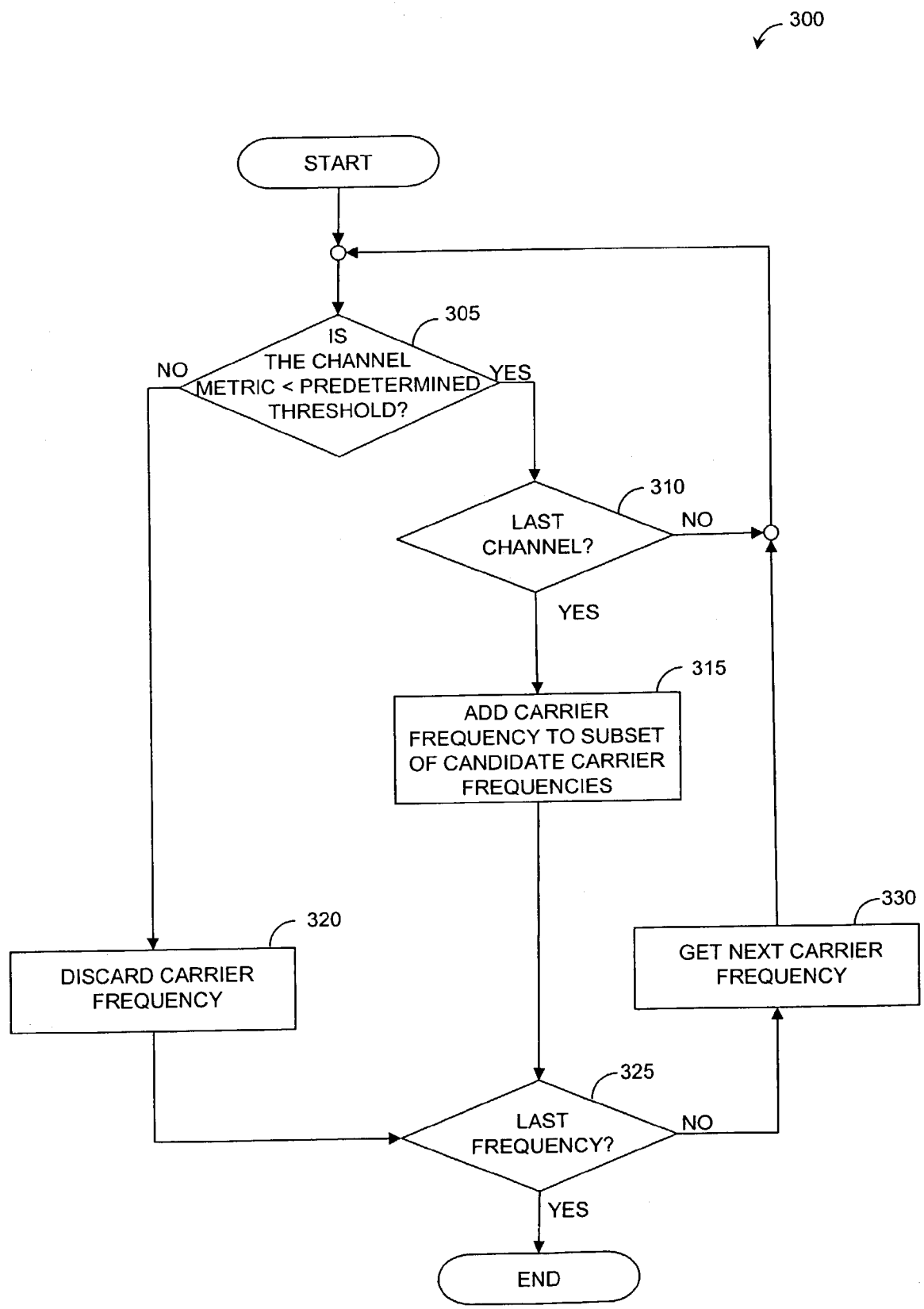
FIG. 3 is a logic flow diagram illustrating an exemplary routine for determining a subset of candidate carrier frequencies for assignment to a user in a power controlled, time slotted communications system.

FIG. 3 is a logic flow diagram of a method 300 for creating a subset of candidate carrier frequencies based on the channel quality metrics (see step 215 in FIG. 2). Beginning at 305, a determination is made whether the channel quality metric for the first channel is better than a predetermined threshold value. For many channel quality metrics, such as BER, FER, and channel interference, a lower value indicates better channel quality. It is assumed, therefore, that a channel quality metric less than a threshold indicates better quality. If the channel quality metric value is less than the predetermined threshold value, then the "YES" branch is followed to 310, in which case a determination is made as to whether this is the last channel on the carrier that is occupied by a current user. If there are additional channels that are occupied by current users, the "NO" branch is followed to 305 where the channel quality metric for the next occupied channel is retrieved. The same steps are then repeated for each remaining carrier frequency.

Returning to 305, if a determination is made that a channel quality metric is greater than a predetermined threshold, the channel is considered to have "poor" quality and is unacceptable for assignment to a mobile user 145. The "NO" branch is then followed to 320, where the carrier frequency is discarded.

Figure 4:
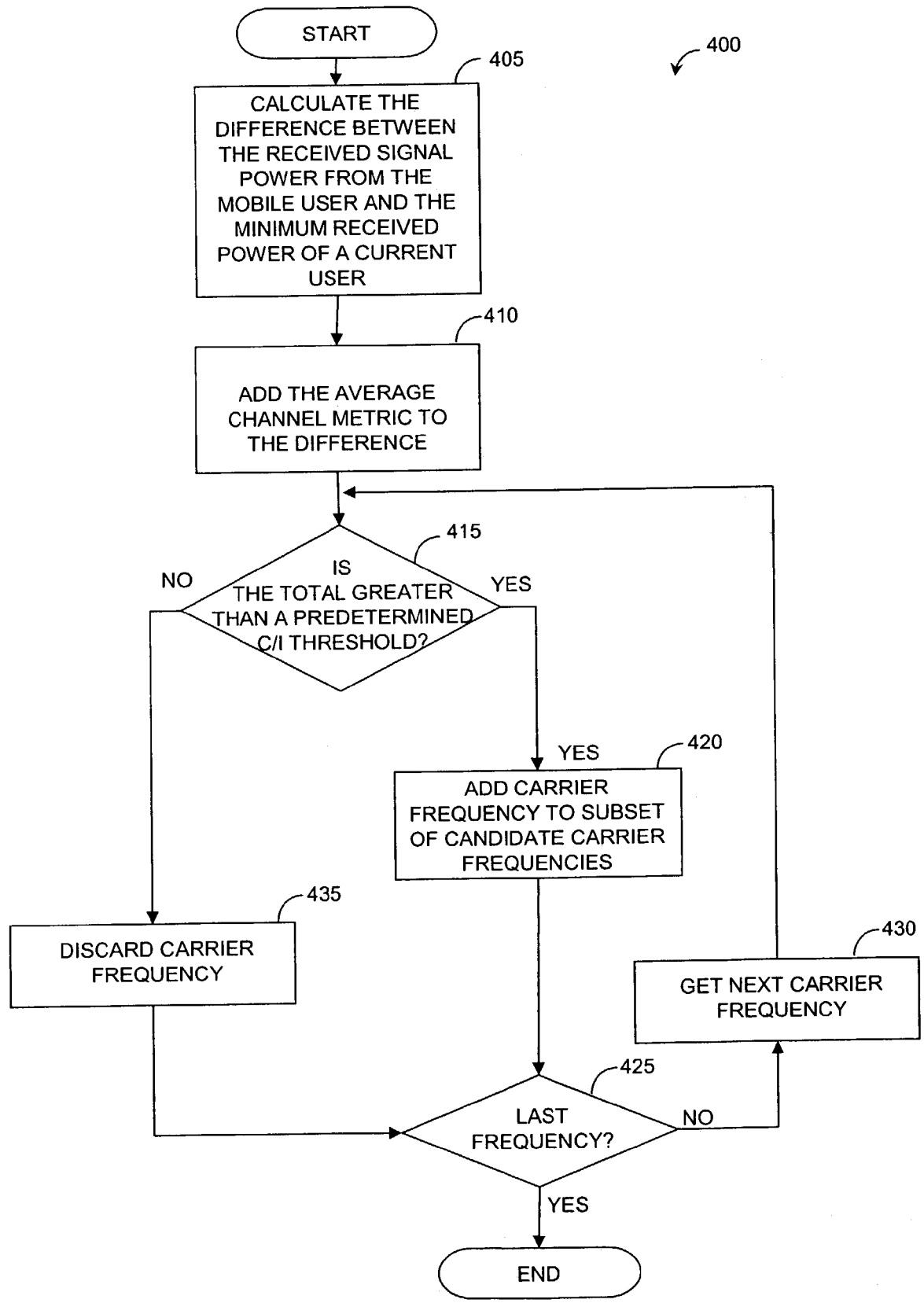
FIG. 4 is a logic flow diagram illustrating an alternative routine for determining a subset of candidate carrier frequencies for assignment to a user in a power controlled, time slotted communications system.

FIG. 4 is a logic flow diagram illustrating an alternative method 400 for selecting the subset of candidate carrier frequencies. Beginning at 405, the difference between the received signal strength of a mobile user and the received signal strength of the current user with the lowest signal strength is calculated. At 410, the channel quality metric is converted to C/I, if applicable, and added to the calculated difference to determine a projected C/I ratio. At 415, the projected C/I ratio is compared to a predetermined C/I threshold value. If the ratio is less than the threshold, the carrier frequency is discarded at 435 and the next carrier frequency, if available, is considered. If the ratio is greater than the threshold, the "YES" branch is followed to 420, where the carrier frequency is added to the subset of candidate carrier frequencies. At 425, a determination is made as to whether the last carrier frequency has been considered to add to the subset of candidate carrier frequencies. When all of the carrier frequencies have been considered, the method is complete. However, if there are additional carrier frequencies to consider, then the "NO" branch is followed to 430, where the next carrier frequency is retrieved. Finally, returning to 415, if the determination is made that the total C/I ratio is greater than the C/I threshold ratio value, the "NO" branch is followed to 435 where the carrier frequency is discarded and not added to the subset of candidate carrier frequencies.

Figure 5:
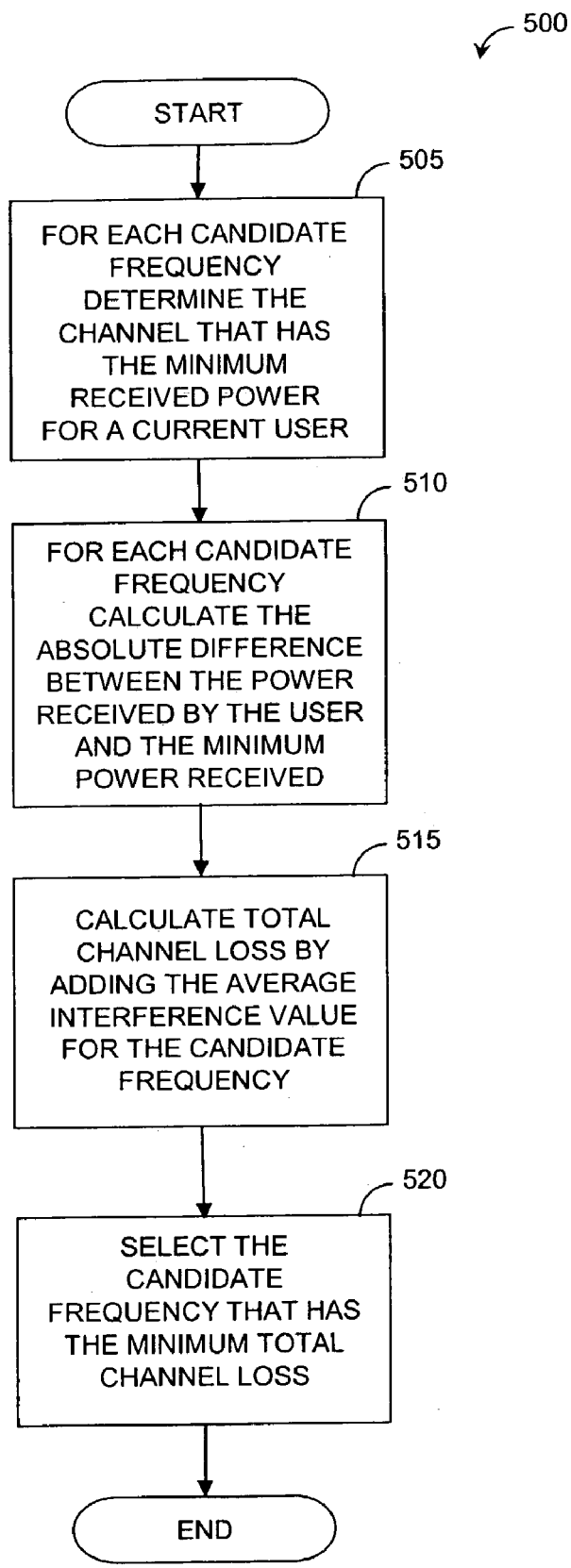
FIG. 5 is a logic flow diagram illustrating a routine for calculating a cost function used to assign a channel to a mobile user in a power controlled, time slotted communications system.

FIG. 5 is a logic flow diagram illustrating an exemplary method 500 of computing the cost function in accordance with one embodiment of the invention. Beginning at 505, the received signal power for the current users in each candidate carrier frequency is examined. The minimum received signal power is then selected for each carrier frequency. At 510, the absolute difference between the received signal power for the mobile user 145 and the minimum received signal power is calculated for each carrier frequency.

At 515, a channel assignment metric is calculated for each candidate frequency by adding the average interference level for the carrier frequency to the absolute difference of signal powers. It should be noted that adding the average interference level for the carrier frequency to the absolute difference is an optional step, because some base stations may lack the ability to monitor the average interference over the carrier frequency. Additionally, it may be impractical to incorporate these levels into the computation due to hardware constraints. Finally, at 520, the candidate frequency that has the smallest channel assignment metric is selected to be assigned to the mobile user 145.

Figure 6:
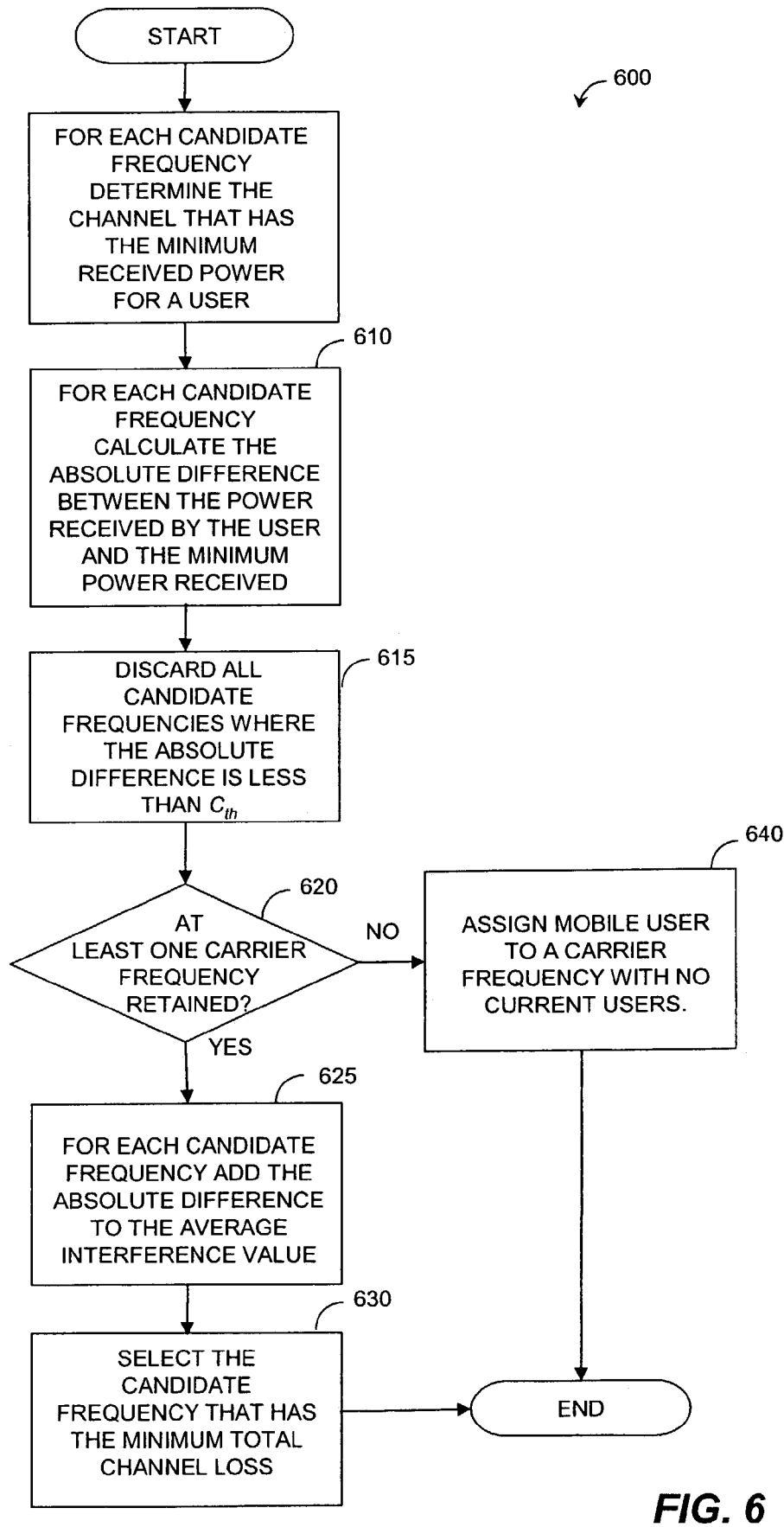
FIG. 6 is a logic flow diagram illustrating an alternative routine for calculating a cost function used to assign a channel to a mobile user in a power controlled, time slotted communications system.

FIG. 6 is a logic flow diagram illustrating of an alternative method 600 of computing the cost function in accordance with the invention (see step 225 in FIG. 2). Beginning at 605, in which the received signal power for the current users in each candidate carrier frequency is examined. The minimum received signal power is then selected for each carrier frequency. At 610, the absolute difference between the received signal power for the mobile user 145 and the minimum received signal power among current users is calculated for each carrier frequency.

At 615, the absolute difference is compared to a predetermined power threshold value, $C_{th}$ and a determination is made as to whether the absolute difference between the received signal power for the mobile user 145 and the minimum received signal power is less than a predetermined threshold power value. If the absolute difference is less than the predetermined power threshold value, then the carrier frequency is retained for consideration. However, if the absolute difference is greater than the threshold value, the carrier frequency is discarded from consideration.

At 620, a determination is made as to whether all of the carrier frequencies have been eliminated from consideration for assignment to the mobile user 145. If at least one carrier frequency has been retained, then the "YES" branch is followed to 625, in which the average interference level is added to the difference between the absolute difference calculated at 610. Finally, the carrier frequency that has the minimum values is selected as to be assigned to the mobile user 145. However, if at 630, a determination is made that there are no available carrier frequencies, the mobile user 145 is assigned to a carrier frequency with no current users. If interference measurements are available, the lowest interference carrier frequency with no current users is assigned to the mobile user 145.

Figure 7:
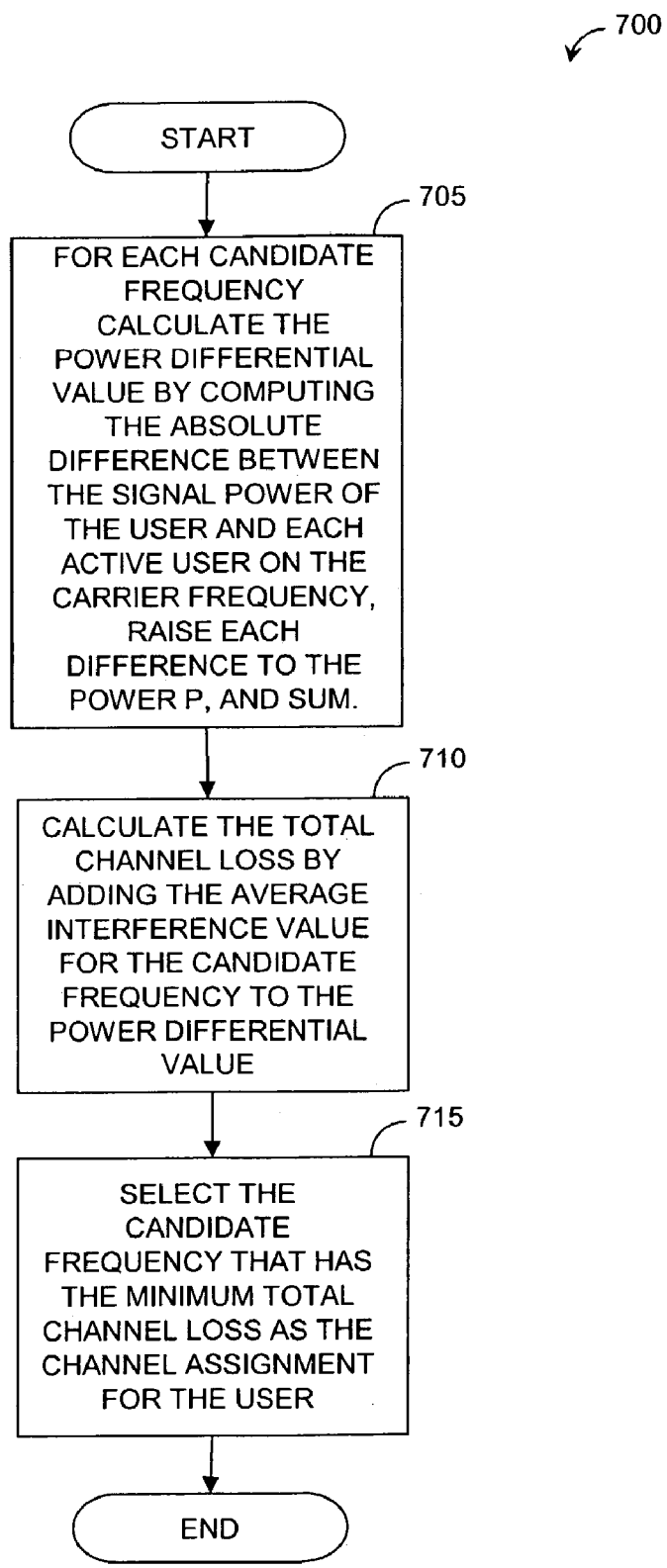
FIG. 7 is a logic flow diagram illustrating another alternative routine for calculating a cost function used to assign a channel to a mobile user in a power controlled, time slotted communications system.

FIG. 7 is a logic flow diagram illustrating yet another alternative method 700 (see Step 225 of FIG. 2). Beginning at 705, for each candidate carrier frequency k, the sum of signal power differences raised to the p-th power is computed as described in equation (3). At 710, the average interference for the $k^{th}$ frequency may be added to the value computed at 705. This metric is described in equation (4).

Next, at 715, the cost function is calculated by determining the minimum calculated value over the carrier frequencies.

Other alternative embodiments will become apparent to those skilled in the art to which an exemplary embodiment pertains without departing from its spirit and scope. Accordingly, the complete scope of the present invention is defined by the appended claims that follow rather than by the foregoing description.

We claim:

1. A method for assigning a channel to a mobile user requesting a channel assignment in a wireless communications system after receiving a signal power measurement associated with the mobile user, the method comprising the steps of: selecting at least one carrier frequency from a plurality of carrier frequencies, the at least one carrier frequency comprising at least one occupied and one unoccupied channel; obtaining received signal power for the at least one occupied channel of the at least one carrier frequency; and selecting a channel on at least one carrier frequency from a subset of candidate carrier frequencies by calculating a cost function based on a received signal power of the mobile user and a received signal power of at least one current user on at least one carrier frequency.

2. The method of claim 1, further comprising the steps of: receiving a channel quality report comprising channel quality metrics for each channel occupied by a current user on each carrier frequency; and creating the subset of candidate carrier frequencies based on channel quality metrics.

3. The method of claim 2, wherein the step of creating the subset of candidate carrier frequencies further comprises the steps of: comparing each channel quality metric to a predetermined threshold channel quality metric value; adding a carrier frequency to the subset of candidate carrier frequencies if each channel quality metric indicates better channel quality than that indicated by the predetermined threshold channel quality metric value; and discarding a carrier frequency if at least one channel quality metric indicates worse channel quality than that indicated by the predetermined threshold channel quality metric value.

4. The method of claim 3, further comprising the steps of: opening a new carrier frequency; and assigning the mobile user to an unoccupied channel of the new carrier frequency if all of the carrier frequencies are discarded.

5. The method of claim 3, further comprising the step of assigning the mobile user to an unoccupied channel of a carrier frequency with at least one occupied channel if all of the carrier frequencies are discarded.

6. The method of claim 1, further comprising the step of creating the subset of candidate carrier frequencies using the steps of: calculating a difference between the received signal power from the mobile user and a received signal power from a current user on a particular channel; calculating a received signal power-to-interference (C/I) ratio; comparing the calculated C/I ratio with a predetermined C/I ratio; adding a carrier frequency to the subset of candidate carrier frequencies if the C/I ratio is greater than the predetermined C/I threshold value; discarding a carrier frequency if the C/I ratio is less than the predetermined C/I threshold value; and opening a new carrier frequency and assigning the mobile user to an unoccupied channel of the new carrier frequency if all of the carrier frequencies are discarded.

7. The method of claim 1, wherein the step of calculating the cost function, comprises: for each candidate carrier frequency in the subset of candidate carrier frequencies, determining a channel with a minimum received power and calculating an absolute difference value between the received power from the mobile user and the minimum received power for the channel; selecting a candidate carrier frequency that has a minimum absolute difference value; and assigning the mobile user to an unoccupied channel of the selected candidate carrier frequency.

8. The method of claim 7, further comprising the steps of: obtaining an average interference value for each candidate carrier frequency in the subset of candidate carrier frequencies; adding an average interference value to the absolute difference between the received power from the mobile user and the minimum received power on a channel; and selecting a candidate carrier frequency that has a minimum value.

9. The method of claim 1, wherein the step of calculating the cost function further comprises the steps of: for each candidate carrier frequency, calculating an absolute difference between the received signal power of the mobile user and a received signal power for each occupied channel, raising each difference to the p.sup.th power, summing these values over all occupied channels, and dividing the result by the number of occupied channels within the candidate carrier frequency; and determining the candidate carrier frequency that has a minimum calculated value.

10. The method of claim 9, further comprising the steps of: obtaining an average interference value for each candidate carrier frequency in the subset of candidate carrier frequencies; for each candidate carrier frequency, calculating an absolute difference between the received signal power of the mobile user and a received signal power for each occupied channel, raising each difference to the p.sup.th power, adding the average interference, summing these values over a occupied channels, and dividing the result by the number of occupied channels within the carrier frequency; and selecting a candidate carrier frequency that has a minimum value.

11. The method of claim 1, wherein the step of calculating the cost function further comprises: for each candidate carrier frequency in the subset of candidate carrier frequencies, determining a channel with a minimum received power and calculating an absolute difference between the received power from the mobile user and the minimum received power for the channel; comparing the absolute difference to a predetermined threshold power value; discarding a candidate carrier frequency if the absolute difference is greater than the predetermined threshold power value; selecting a candidate carrier frequency that has a minimum absolute difference value from the remaining candidate carrier frequencies; and assigning the mobile user to an unoccupied channel of the selected candidate carrier frequency.

12. The method of claim 1, further comprising the step of requesting a channel assignment, said step being triggered by an event selected from the list consisting of receiving a call setup request, intra-sector handover, inter-sector handover, detecting a change in received signal strengths on at least one carrier frequency, or detecting a change in average interference levels for at least one candidate carrier frequency.

13. A channel assignment unit (CAU) for assigning a channel to a mobile user within a wireless communications system, comprising: a processor unit operable to: obtain the received signal power for a mobile user requesting a channel assignment; select at least one carrier frequency from a plurality of carrier frequencies, the at least one carrier frequency having at least one occupied and one unoccupied channel; and select a channel on at least one candidate carrier frequency from a subset of candidate carrier frequencies by calculating a cost function based on the received signal power of the mobile user and the received signal power of at least one current user on at least one carrier frequency.

14. The CAU of claim 13, wherein the processor unit is further operable to: receive a channel quality report for the at least one occupied channel assigned to a current user of the at least one selected carrier frequency, the channel quality report consisting of a received signal strength of the current user and a channel quality metric; and create the subset of candidate carrier frequencies based on the channel quality metrics.

15. The CAU of claim 14, wherein the processor unit is further operable to create the subset of candidate carrier frequencies by: comparing the channel quality metric to a predetermined threshold value; adding a carrier frequency to the subset of candidate carrier frequencies if each channel quality metric indicates better channel quality than that indicated by, the predetermined threshold value; and discarding a carrier frequency if at least one channel quality metric for the carrier frequency indicates worse channel quality than that indicated by the predetermined threshold value.

16. The CAU of claim 15, wherein the processor unit is further operable to: open a new carrier frequency and assign the mobile user to an unoccupied channel of the new carrier frequency if all of the carrier frequencies are discarded.

17. The CAU of claim 15, wherein the processor unit is further operable to: assign the mobile user to an unoccupied channel of a carrier frequency with at least one occupied channel if all of the carrier frequencies are discarded.

18. The CAU of claim 13, wherein the processor unit is further operable to create the subset of candidate carrier frequencies using channel quality metrics by: calculating a difference between the received signal power from the mobile user and a received signal power from a current user on a particular channel; calculating a received signal power-to-interference (C/I) ratio by converting the channel quality metric to C/I, if applicable, and adding it to the computed signal power difference; comparing the calculated C/I ratio with a predetermined C/I ratio; adding a carrier frequency to the subset of candidate carrier frequencies if the C/I ratio is greater than the predetermined C/I threshold value; discarding a carrier frequency if the C/I ratio is less than the predetermined C/I threshold value; and opening a new carrier frequency and assigning the mobile user to an unoccupied channel of the new carrier frequency if all of the carrier frequencies are discarded.

19. The CAU of claim 13, wherein the processor unit is further operable to calculate the cost function by: for each candidate carrier frequency in the subset of candidate carrier frequencies, determining a channel with a minimum received power and calculating an absolute difference value between the received power from the mobile user and the minimum received power for the channel; selecting a candidate carrier frequency that has a minimum absolute difference value; and assigning the mobile user to an unoccupied channel of the selected carrier frequency.

20. The CAU of claim 19, wherein the processor unit is further operable to: obtain an average interference value for each candidate carrier frequency in the subset of candidate carrier frequencies; add the average interference value to the absolute difference between the received power from the mobile user and the minimum received power of the channel; and select a candidate carrier frequency that has a minimum value.

21. The CAU of claim 13, wherein the processor unit is further operable to calculate the cost function by: for each candidate carrier frequency, calculating an absolute difference between the received signal power of the mobile user and a received signal power for each occupied channel, raising each difference to the p.sup.th power, summing these values over all occupied channels, and dividing the result by the number of occupied channels within the candidate carrier frequency; and determining a candidate carrier frequency that has a minimum calculated value.

22. The CAU of claim 13, wherein the processor unit is further operable to: obtain an average interference value for each candidate carrier frequency in the subset of candidate carrier frequencies; for each candidate carrier frequency, calculate the absolute difference between the received signal power of the mobile user and the received signal power for each occupied channel, raising each difference to the p.sup.th power, adding an average interference, summing these values over all occupied channels, and dividing the result by the number of occupied channels within the candidate carrier frequency; and select a candidate carrier frequency that has a minimum value.

23. The CAU of claim 13, wherein the processor unit is further operable to calculate the cost function by: for each candidate carrier frequency in the subset of candidate carrier frequencies, determining a channel with the minimum received power and calculating an absolute difference value between the received power from the mobile user and the minimum received power for the channel; comparing the absolute difference to a predetermined threshold power value; discarding a candidate carrier frequency if the absolute difference is greater than the predetermined threshold power value; selecting a candidate carrier frequency that has the minimum absolute difference value from the remaining candidate carrier frequencies; and assigning the mobile user to an unoccupied channel of the selected carrier frequency.

24. The CAU of claim 23, wherein the processor unit is further operable to: detect an event selected from the list consisting essentially of a call setup request, an intra-sector handover, an inter-sector handover, a change in the received signal strengths on at least one carrier frequency, a change in the average interference levels for at least one carrier frequency, and a call departure signal; and initiate the assignment of a channel to the mobile user upon detecting such an event.

25. A channel assignment unit (CAU) for assigning a channel to a mobile user within a wireless communications system, comprising: means for obtaining the received signal power for the mobile user requesting a channel assignment; means for selecting the carrier frequencies from a plurality of carrier frequencies, each carrier frequency having at least one occupied and one unoccupied channel; means for selecting a channel on at least one candidate carrier frequency from a subset of candidate carrier frequencies by calculating a cost function based on the received signal power of the mobile user and a received signal power of at least one current user on at least one carrier frequency.

26. The CAU of claim 25, further comprising: means for receiving a channel quality report for each occupied channel assigned to a current user of each selected carrier frequency, the channel quality report consisting of a received signal strength of the current user of the selected carrier frequency and channel quality metrics; and means for creating the subset of candidate carrier frequencies based on the channel quality metrics.

27. The CAU of claim 26, wherein the means for creating the subset of candidate carrier frequencies comprises: means for comparing each channel quality metric to a predetermined threshold value; means for adding a carrier frequency to the subset of candidate carrier frequencies if each channel quality metric indicates better channel quality than that indicated by the predetermined threshold value; and means for discarding a carrier frequency if at least one channel quality metric for the carrier frequency indicates worse channel quality than that indicated by the predetermined threshold value.

28. The CAU of claim 25, further comprising means for opening a new carrier frequency and assign the mobile user to an unoccupied channel of the new carrier frequency if a of the carrier frequencies are discarded.

29. The CAU of claim 25, further comprising means for assigning the mobile user to an unoccupied channel of a carrier frequency with at least one occupied channel if all of the carrier frequencies are discarded.

30. The CAU of claim 25; wherein the means for selecting a subset of candidate carrier frequencies further comprises: means for calculating a difference between the received signal power from the mobile user and a received signal power from a current user on a particular channel; means for calculating a received signal power-to-interference (C/I) ratio by converting the channel quality metric to C/I, if applicable, and adding it to the computed signal power difference; means for comparing the calculated C/I ratio with a predetermined C/I ratio; means for adding a carrier frequency to the subset of candidate carrier frequencies if the C/I ratio is greater than the predetermined C/I threshold value; means for discarding a carrier frequency if the C/I ratio is less than the predetermined C/I threshold value; and means for opening a new carrier frequency and assign the mobile user to an unoccupied channel of the new carrier frequency if a of the carrier frequencies are discarded.

31. The CAU of claim 25, further comprising means for calculating the cost function, said means comprising: means for determining a channel with a minimum received power and calculating an absolute difference value between the received power from the mobile user and the minimum received power for the channel for each candidate carrier frequency in the subset of candidate carrier frequencies; means for selecting a candidate carrier frequency that has a minimum absolute difference value; and means for assigning the mobile user to an unoccupied channel of the selected carrier frequency.

32. The CAU of claim 31, further comprising: means for obtaining an average interference value for each candidate earner frequency in the subset of candidate carrier frequencies; means for adding the average interference value to the absolute difference between the received power from the mobile user and the minimum received power of the channel; and means for selecting a candidate carrier frequency that has a minimum value.

33. The CAU of claim 25, further comprising: means for calculating an absolute difference between the received signal power of the mobile user and a received signal power for each occupied channel, raising each difference to the p.sup.th power, summing these values over all occupied channels, and dividing the result by the number of occupied channels within the candidate carrier frequency for each frequency; and means for selecting a candidate carrier frequency that has a minimum calculated value.

34. The CAU of claim 25, further comprising means for calculating the cost function, said means comprising: means for obtaining an average interference value for each candidate carrier frequency in the subset of candidate carrier frequencies; for each candidate carrier frequency, means for calculating the absolute difference between the received signal power of the mobile user and the received signal power for each occupied channel, raising each difference to the p.sup.th power, adding an average interference, summing these values over a occupied channels, and dividing the result by the number of occupied channels within the candidate carrier frequency; and means for selecting a candidate carrier frequency that has a minimum value.

35. The CAU of claim 33, wherein the means for calculating the absolute difference further comprises: for each candidate carrier frequency in the subset of candidate carrier frequencies, means for determining a channel with the minimum received power and calculating an absolute difference value between the received power from the mobile user and the minimum received power for the channel; means for comparing the absolute difference to a predetermined threshold power value; means for discarding a candidate carrier frequency if the absolute difference is greater than the predetermined threshold power value; means for selecting a candidate carrier frequency that has the minimum absolute difference value from the remaining candidate carrier frequencies; and means for assigning the mobile user to an unoccupied channel of the selected carrier frequency.

* * * * *